United States Patent [19]

Mukherjee

[11] Patent Number: 5,197,001
[45] Date of Patent: Mar. 23, 1993

[54] BILL OF MATERIAL AND PROJECT NETWORK PROCESSING

[75] Inventor: Sujan K. Mukherjee, Roswell, Ga.

[73] Assignee: International Business Machines Corp., Armonk, N.Y.

[21] Appl. No.: 523,092

[22] Filed: May 14, 1990

[51] Int. Cl.⁵ .............................................. G06F 15/24
[52] U.S. Cl. .................................... 364/403; 364/401; 364/468
[58] Field of Search ............... 364/401, 403, 406, 468, 364/478, 469

[56] References Cited

U.S. PATENT DOCUMENTS

| | | | |
|---|---|---|---|
| 4,821,197 | 4/1989 | Kenik et al. | 364/468 |
| 4,827,423 | 5/1989 | Beasley et al. | 364/468 |
| 4,862,376 | 8/1989 | Ferriter et al. | 364/468 |
| 4,924,385 | 5/1990 | Dote | 364/403 |
| 5,109,337 | 4/1992 | Ferriter et al. | 364/401 |

OTHER PUBLICATIONS

"Structured Bill of Material Explode," by N. R. Dono and J. H. McMahon, IBM TDB, vol. 17, No. 11, Apr. 1975, pp. 3370–3372.

"Representing Bill of Material and Where-Used Product Structure Data," by J. P. Bishop, IBM TDB, vol. 31, No. 6, Nov. 1988, pp. 355–360.

Primary Examiner—Robert A. Weinhardt
Assistant Examiner—Jennifer L. Hazard
Attorney, Agent, or Firm—John J. Timar

[57] ABSTRACT

A method for processing bill of material data in which low-level codes are updated in a bottom-to-top direction, from component items to subassemblies to assemblies. Updating the low-level code on a bottom to top traversal of a hierarchical path eliminates the need to maintain copies of the original low-level codes for recovery purposes. Continuity checking is performed before the low-level codes are updated. Low-level coding is extended for use in project network processing by substituting for the low-level code, the activity early start time in the forward pass and late finish time in the backward pass, and substituting for the increment value used in low-level coding, the activity duration time.

13 Claims, 5 Drawing Sheets

| HIER-ARCHICAL PATH TRAVERSED | CONTINUITY CHECK AND EXPLOSION CONTROL ENTRIES | | | | REMARKS |
|---|---|---|---|---|---|
| | ENTRY SERIAL | ITEM KEY | OLD LLC | NEW LLC | |
| A | 1 | +A | 0 | 0 | END ITEM A HAS LLC = 0 |
| A/B | 2 | +B | 0 | 10 | PARENT A HAS LLC = 0 |
| A/B/C | 3 | +C | 0 | 20 | PARENT B HAS LLC = 10 |
| A/B/C/Y | 4 | +Y | 0 | 30 | PARENT C HAS LLC = 20 |
| A/B/C | 4 | −Y | | | UPDATE Y WITH LLC = 30 |
| A/B/C/Z | 4 | +Z | 0 | 30 | PARENT C HAS LLC = 20 |
| A/B/C | 4 | −Z | | | UPDATE Z WITH LLC = 30 |
| A/B | 3 | −C | | | UPDATE C WITH LLC = 20 |
| A/B/X | 3 | +X | 0 | 20 | PARENT B HAS LLC = 10 |
| A/B | 3 | −X | | | UPDATE X WITH LLC = 20 |
| A/B/Y | 3 | +Y | 30 | 30 | PARENT B HAS LLC = 10 |
| A/B | 3 | −Y | | | NO CHANGE, DO NOT UPDATE |
| A | 2 | −B | | | UPDATE B WITH LLC = 10 |
| A/C | 2 | +C | 20 | 20 | NO CHANGE, DO NOT EXPLODE |
| A | 2 | −C | | | NO CHANGE, DO NOT UPDATE |
| A/X | 2 | +X | 20 | 20 | PARENT A HAS LLC = 0 |
| A | 2 | −X | | | NO CHANGE, DO NOT UPDATE |
| END | 1 | −A | | | NO CHANGE, DO NOT UPDATE |

A, B, C ARE ASSEMBLIES
X, Y, Z ARE PURCHASED ITEMS/MATERIALS

| HIER- ARCHICAL PATH TRAVERSED | CONTINUITY CHECK AND EXPLOSION CONTROL ENTRIES | | | | REMARKS |
|---|---|---|---|---|---|
| | ENTRY SERIAL | ITEM KEY | OLD LLC | NEW LLC | |
| A | 1 | +A | 0 | 0 | END ITEM A HAS LLC = 0 |
| A/B | 2 | +B | 0 | 10 | PARENT A HAS LLC = 0 |
| A/B/C | 3 | +C | 0 | 20 | PARENT B HAS LLC = 10 |
| A/B/C/Y | 4 | +Y | 0 | 30 | PARENT C HAS LLC = 20 |
| A/B/C | 4 | −Y | | | UPDATE Y WITH LLC = 30 |
| A/B/C/Z | 4 | +Z | 0 | 30 | PARENT C HAS LLC = 20 |
| A/B/C | 4 | −Z | | | UPDATE Z WITH LLC = 30 |
| A/B | 3 | −C | | | UPDATE C WITH LLC = 20 |
| A/B/X | 3 | +X | 0 | 20 | PARENT B HAS LLC = 10 |
| A/B | 3 | −X | | | UPDATE X WITH LLC = 20 |
| A/B/Y | 3 | +Y | 30 | 30 | PARENT B HAS LLC = 10 |
| A/B | 3 | −Y | | | NO CHANGE, DO NOT UPDATE |
| A | 2 | −B | | | UPDATE B WITH LLC = 10 |
| A/C | 2 | +C | 20 | 20 | NO CHANGE, DO NOT EXPLODE |
| A | 2 | −C | | | NO CHANGE, DO NOT UPDATE |
| A/X | 2 | +X | 20 | 20 | PARENT A HAS LLC = 0 |
| A | 2 | −X | | | NO CHANGE, DO NOT UPDATE |
| END | 1 | −A | | | NO CHANGE, DO NOT UPDATE |

FIG. 6

| HIER-ARCHICAL PATH TRAVERSED | CONTINUITY CHECK AND EXPLOSION CONTROL ENTRIES | | | | REMARKS |
|---|---|---|---|---|---|
| | ENTRY SERIAL | ITEM KEY | OLD LLC | NEW LLC | |
| Y | 1 | +Y | 40 | 40 | DEFAULT LLC FOR Y = 40 |
| Y/B | 2 | +B | 40 | 30 | PARENT Y HAS LLC = 40 |
| Y/B/A | 3 | +A | 40 | 20 | PARENT B HAS LLC = 30 |
| Y/B | 3 | −A | | | UPDATE A WITH LLC = 20 |
| Y | 2 | −B | | | UPDATE B WITH LLC = 30 |
| Y/C | 2 | +C | 40 | 30 | PARENT Y HAS LLC = 40 |
| Y/C/B | 3 | +B | 30 | 20 | PARENT C HAS LLC = 30 |
| Y/C/B/A | 4 | +A | 20 | 10 | PARENT B HAS LLC = 20 |
| Y/C/B | 4 | −A | | | UPDATE A WITH LLC = 10 |
| Y/C | 3 | −B | | | UPDATE B WITH LLC = 20 |
| Y/C/A | 3 | +A | 10 | 10 | PARENT C HAS LLC = 30 |
| Y/C | 3 | −A | | | NO CHANGE, DO NOT UPDATE |
| Y/C/K | 3 | +K | 40 | 20 | PARENT C HAS LLC = 30 |
| Y/C | 3 | −K | | | UPDATE K WITH LLC = 20 |
| Y | 2 | −C | | | UPDATE C WITH LLC = 30 |
| Y/K | 2 | +K | 20 | 20 | PARENT Y HAS LLC = 40 |
| Y | 2 | −K | | | NO CHANGE, DO NOT UPDATE |
| END | 1 | −Y | | | UPDATE Y WITH LLC = 40 |

BILL OF MATERIAL AND PROJECT NETWORK PROCESSING

BACKGROUND OF THE INVENTION

The present invention relates, in general, to improvements in manufacturing planning and, in particular, to a method and system for efficiently processing bill of material and project network data. These improvements are accomplished by refinements in the techniques of low level coding and continuity checking which are integral to automated bill of material processing.

Bill of material processing is used to define product structure which consists of end products, assemblies, subassemblies and component parts. The use of bill of material data in both implementing engineering changes and in material requirements planning is well known. Project networks are used for managing process development, construction and product manufacturing projects.

Low level coding and continuity checking are established techniques for production planning and control. Low level coding is generally used to facilitate the planning of material requirements, from end items down to raw materials and purchased parts. The low-level code for an item in a bill of material indicates the lowest level where the item was used as a component of higher levels of assemblies and subassemblies. Low-level codes (LLC) are used to avoid repeated explosion/implosion of multiple-use sub-assemblies each time they are encountered in the bill of material, thus increasing the efficiency of summarized bill of material retrieval and material requirements planning. A peculiarity of common low-level coding is the reverse order of the numeric value of the code assigned to an item at a particular level when compared to the highest level assembly. While an end item is logically at the highest level in the hierarchy, its low-level code is zero. The lower the level within the hierarchy of a bill of material, the higher is the numeric value of the code.

Continuity checking is a prerequisite for the effective maintenance of manufacturing product structures. It assures the continuity of the related bill of material, i.e., it prevents a part from being accidentally contained in itself. If continuity is violated, a loop is produced, and proper assignment of low-level codes cannot be made.

The techniques of low-level coding and continuity checking can be applied to any problem that can be expressed as a directed graph or network. In a network, the low-level code represents the relative distance between a particular node in a network and one or more end nodes. The relative distance is expressed by the number of edges on the longest directed path from any one node to any end node.

Gaining data processing efficiency through the implementation of summarized logic based on low-level code involves an overhead associated with low-level code maintenance. Any time a new component is added to any assembly bill of material, it is necessary to verify that the component low-level code is numerically greater than the low-level code of the assembly to which the component is to be added. If it isn't, the low-level code of the component is made at least one greater than its higher level assembly. If the component item happens to be another assembly, then all of its components must be similarly verified. The process may need to be repeated recursively until the lowest level raw material or purchased item is reached.

Figure 1:
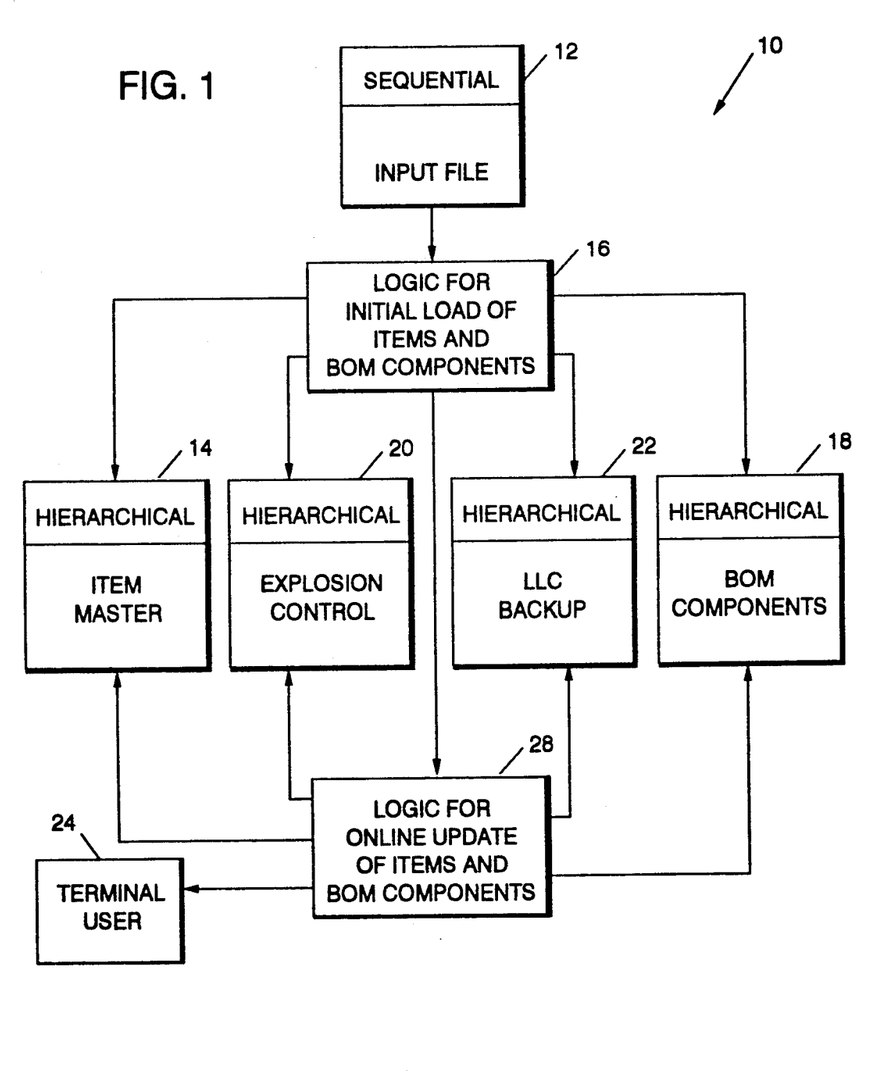
FIG. 1 is a system block diagram showing the components used in other implementations for initial loading and subsequent updating of bill of material data.

FIG. 1 is a system block diagram showing the components used in other implementations for initial loading of both item and bill of material component data in batch processing and the subsequent on-line updating of the same data using hierarchical data bases. Bill of material processing system 10 contains two control files 20 and 22 that are used during the initial loading as well as during the subsequent updating of data.

In commercially available methods, when updating low-level codes, the original low-level codes are copied into backup control file 22. If a loop is detected, processing is terminated and the original low-level codes are restored. Additionally, some other information is recorded into the explosion control file 20 to keep track of the recursive update process and to detect product structure continuity errors. Thus, low-level code maintenance involves a significant overhead. Commercially available software products implementing low-level coding/continuity checking techniques include IBM Corporation's Data Language/I (DL/I DOS/VS) and Information Management System/Virtual Storage (IMS/VS). Detailed documentation is available in "IBM System/370 Low-level Code/Continuity Check in Data Language/I DOS/VS: Program Reference and Operations Manual", "IMS/VS Low-level Code/Continuity Check In Data Language/I: Program Reference and Operations Manual", and "COPICS Bill of Material/On-line and Batch Utilities II with Repetitive Data Management: User Guide and Reference Manual.+ It should be noted that these products apply only to bill of material processing; low-level code processing techniques have not been previously used for project network processing. There are many software products available for project management. An example is IBM Corporation's Application System product which is described in the publication "Managing Projects with Application System."

New users of a bill of material software product create new item master data 14 and product structure (bill of material component) data 18 either from scratch or by copying data from existing databases using sequential file 12. Any existing low-level codes are initialized to zero and new low-level codes are to be generated and stored in item master records 14. During the initial generation of low-level codes, logic means 16 processes input item master records 14 sequentially. No further processing is required if either the item has no component items in product structure file 18 or the item has a low-level code greater than zero, i.e., this item has already been processed as the component of another item. If processing is required, the item is exploded into its components. If the low-level code of the component is higher than that of the parent item, no low-level code updating is required. Otherwise, the numeric value of the low-level code of the parent item is incremented by one and stored as the new low-level code of its component item. If the component item has sub-components, this process is repeated recursively.

The low-level code updating process performed by logic means 28 is similar to that for initial generation of low-level codes. Each time a new component record is added to the bill of material database 18 by the terminal user 24, the low-level code for the component item must be maintained to ensure that it is numerically higher than the low-level code of its parent item. If not, the low-level code for the component item will have to be updated. If the component item has subcomponents, then the component item has to be exploded and the update process continued recursively until no more updating is required for the subcomponents. When product structure relationships are deleted, it is not necessary to decrement the low-level codes. The use of low-level codes is not affected if lower in the scale, i.e., greater in numeric value than the actual usages in the product structure trees. Decrementing low-level codes require extensive processing of where-used relationships and results in decreased performance.

In the available software products, the explosion sequence (tree walking) is a combination of horizontal (left to right) and vertical (top to bottom) explosions, sometimes called diagonal explosion. This technique is used primarily to avoid unnecessary locking of the entire product structure tree by retrieving every component item with the intent to update it. Instead, parts of the product structure tree are retrieved initially without update intent. Those paths requiring a low-level code updating are then retrieved again in order to update them.

Each item is first exploded one level horizontally and all components at that level are examined. Only those components that require low-level code updating are entered into a list which is maintained in explosion control database 20. Each entry contains an identifier which is composed of a low-level code and the component item key. Each of these selected component records are retrieved a second time and their low-level codes are updated with a value which is one greater than the low level code of the parent item. The new low-level codes are also entered into the control database.

Subsequently, using vertical explosion, the first occurrence of a component key headed by the new low-level code is read back from the control database. This component is then further exploded using horizontal explosion. In this manner, the left most hierarchical path is first exploded vertically. When the processing of the left most path is completed, the traversal is reversed to reach the adjacent parallel path on the right. Since the old path is not traversed again, the previously exploded component reference is removed from the control database.

A prerequisite for the creation and maintenance of bills of material is reliable checking of assembly-to-subassembly continuity. An improper sequence may cause bill of material retrieval for production planning programs to loop, for instance, when a part is contained either directly or indirectly within itself. This error condition is referred to as a continuity error or a bill of material loop. Similar loops can also be encountered by processing unidirectional networks such as project networks.

During low-level code generation and updating, it is essential to perform continuity checks to preserve the integrity of product structure data. Each branch of the product structure tree, originating from the parent item, constitutes a distinct hierarchical path. A hierarchical path is defined by the path from a parent item (root node) to a particular purchased item or raw material (leaf node) within the product structure tree. In a particular hierarchical path, no item must occur twice. As each path is traversed, an entry consisting of the component item identifier (key) is made in a control record in explosion control file 20 for each item encountered while traversing the path from top to bottom. The continuity of the product structure is verified by checking each new entry against all existing entries to detect whether the new entry is a duplicate of an existing entry. If no duplicates are encountered upon reaching the leaf node (a purchased item or a raw material), then the direction of traversal is reversed and the entry is deleted from the control record. The process is then repeated for the adjacent path, proceeding from left to right and then from top to bottom. Thus, at any point in time, only one path or a partial path is recorded in the control record.

While traversing a specific branch of the product structure tree, the traversal is stopped when an existing low-level code for a component item is found to be numerically higher than its parent assembly. The assumption made is that the low-level codes for all lower level components have been previously checked for continuity. When a loop is detected, the update process is terminated and the database is returned to a consistent state with respect to the low-level codes that may have already been updated. Each time a low-level code for an item is updated, a backup copy of the original low-level code is written into the backup control database 22. The entry consists of the item key and the old low-level code. When a continuity error is detected the insertion of the product structure record is terminated and the original low-level codes are recovered from the control database. Low-level codes are updated during the forward pass from top to bottom through a hierarchical path before detection of any continuity error. When an error is detected, the low-level codes must be restored to original values, otherwise product structure continuity will be lost.

It may be noted that database managers log all changes to data and are capable of rolling back all changes made within a logical unit of work. Although it may appear that it is unnecessary to keep copies of original low-level codes in a control database, defining every insertion of a single product structure record as a separate unit of work may involve unacceptable overheads caused by the database commit process. Traditionally, the commit/rollback capabilities of database managers have not been used for restoring low-level codes.

Although at least superficially, there does not appear to be any relationship between bill of material processing and project network processing, similarities do exist and are described more fully below. However, for background information the references cited herein provide well-known descriptions of prior art project network methods.

There are three major variations in project management techniques commonly used in commercially available software: Project Evaluation and Review Technique (PERT), Critical Path Method (CPM), and Precedence Diagramming. The leading text reference for these techniques is "Project Management with CPM, PERT, and Precedence Diagramming," third edition, by Joseph J. Moder, Cecil R. Phillips and Edward W. Davis, Van Nostrand Reinhold Company, Inc., 1983. Traditionally, computer programs for project control have used two dimensional matrices which are presorted in i-j node sequence and stored either in memory or in sequential files. The recent trend has been to store the matrices in relational databases, but the processing logic continues to be sequential in nature. The random access capability of relational databases have not been exploited in project network software.

SUMMARY OF THE INVENTION

It is an object of this invention to provide an improved method of low-level coding for bill of material processing that significantly reduces the overhead associated with generating and updating low-level codes.

It is another object of this invention to provide an improved method for preventing loops in bill of material processing.

It is a further object of this invention to provide an improved method for processing project network structures that eliminates the requirement for sequential processing.

These and other objects and advantages are accomplished by the present invention in which vertical explosion is performed on a bill of material from the highest assembly down to the lowest component items in a top to bottom and then left to right sequence. As the traversal proceeds, a new low-level code is assigned to each item encountered in a hierarchical path having a low-level code that is less than or equal to that of its predecessor item. A temporary list is maintained in random access memory containing each item identifier, the current low-level code and the newly assigned low-level code. During the bottom-to-top traversal of this same hierarchical path, the low-level code is updated for each item identifier having a newly assigned low-level code that is higher than its previously assigned code. Continuity checking is performed during the top-to-bottom traversal of each hierarchical path by comparing the item identifier of each item added to the temporary list with the item identifiers presently on the list to determine if there are any duplicate entries.

Project networks can also take advantage of the same low-level coding and vertical explosion techniques. The low-level codes are replaced by the early start time for each activity. The increment value is replaced by the activity duration time which is added to the early start time to get the early finish time for an activity. All computations for early start time and early finish time are computed during the forward pass; a backward pass is made to determine late start and late finish time. A sequence number is maintained to facilitate the backward traversal. Activity float and the critical path are determined in the well-established way used in the prior art.

The foregoing features and advantages of the invention will be more fully described below in conjunction with the accompanying drawings.

DETAILED DESCRIPTION OF THE PREFERRED EMBODIMENT

Figure 2:
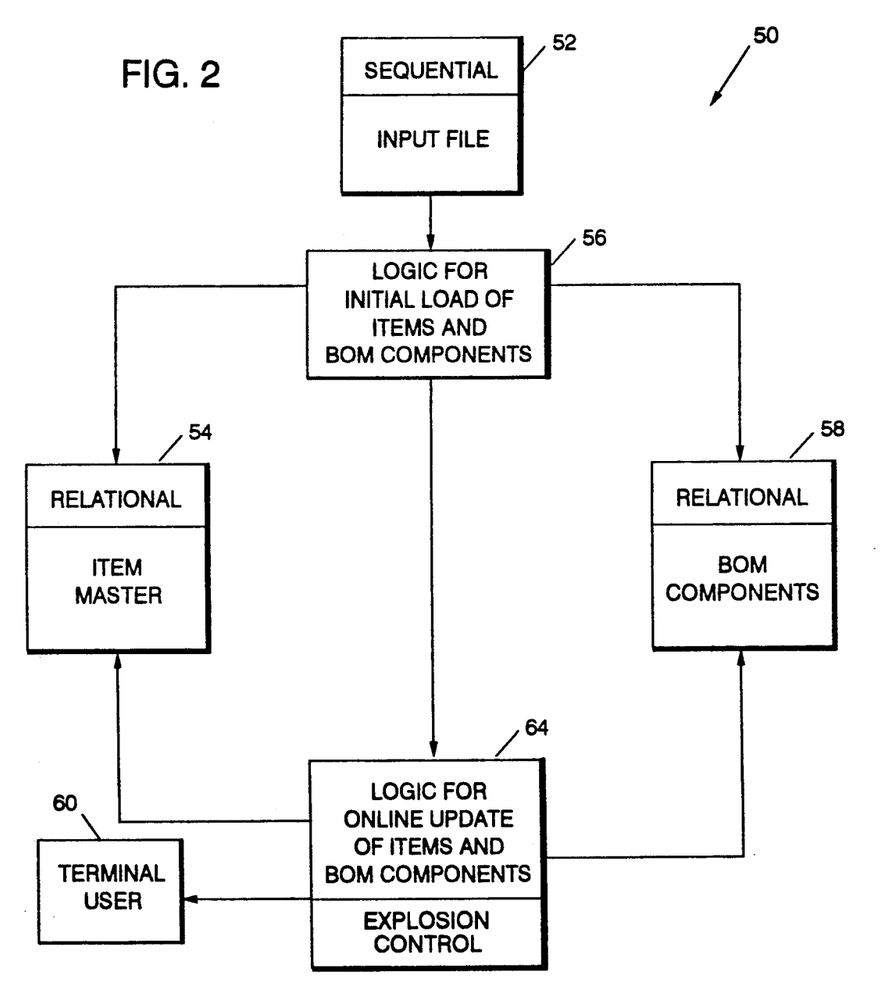
FIG. 2 is a system block diagram showing the components used in the preferred embodiment for initial loading and subsequent updating of bill of material data.

FIG. 2 is a system block diagram showing the components used in this invention for the batch initial loading of item and bill of material component data and the subsequent on-line updating of the same data using relational data bases. The bill of material processing system 50 includes sequential input file 52 for inputting item master records, item master database 54, bill of material database 58, logic means 56 for the initial loading of items and bill of material components, and logic means 64 for the on-line update of the item master and bill of material databases 54, 58. Logic means 64 provides temporary storage of item identifiers and low-level codes during a bill of material explosion for continuity checking.

Figure 3:
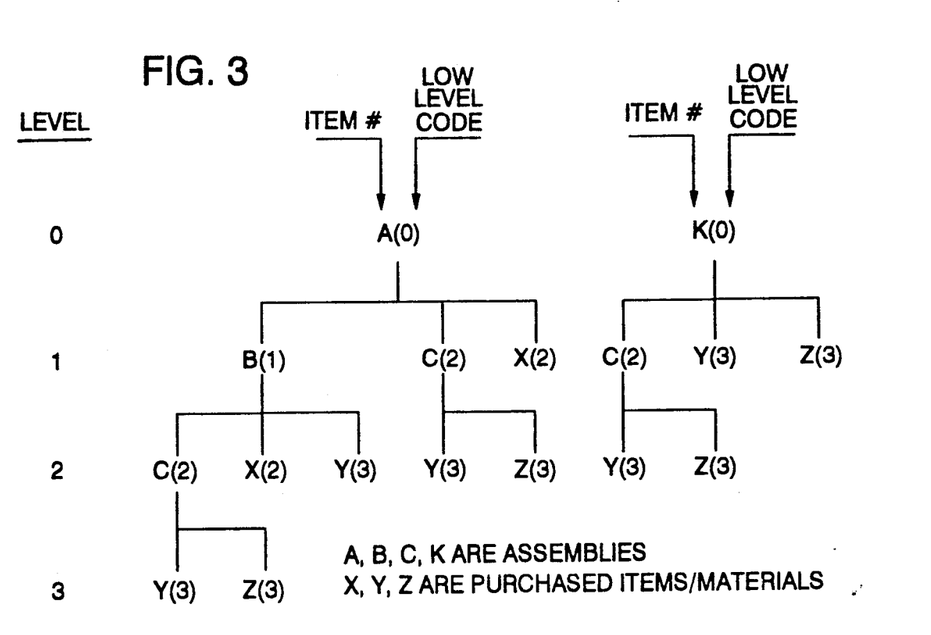
FIG. 3 is an illustration of the assignment of low-level codes to manufacturing product structures or bills of material.

FIG. 3 illustrates the assignment of low-level codes to manufacturing product structures or bills of material. A manufacturing product structure can be considered as a tree structure. At the top of the trees are end items which are assigned low-level codes of zero. All component items are assigned low-level codes which are numerically higher than the low-level code assigned to the higher level assembly or end item. For a multiple-use component item, the highest numerical value encountered is assigned as the low-level code. This represents the lowest level at which a multiple-use component item is used within the entire product structure database.

Figure 4:
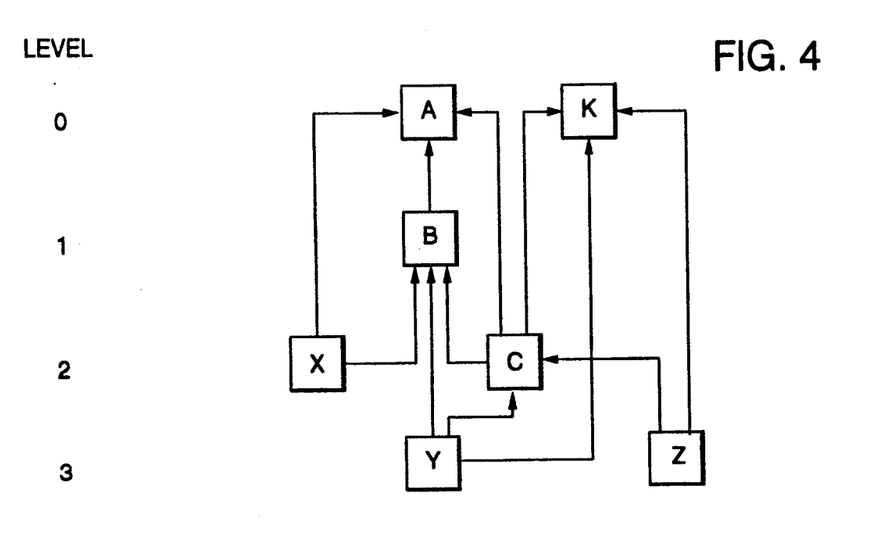
FIG. 4 is an illustration of a network representation of a product structure.

FIG. 4 is an illustration in which a product structure is represented by a network which can be described as a directed graph. This figure corresponds to the bill of material structure shown in FIG. 3. The nodes in this network are items, the edges represent the hierarchical relationship between two adjacent nodes, i.e., the product structure information. For example, node Y corresponds to item Y in FIG. 3 and has three directed arrows leading to nodes B, C and K. This indicates that item Y is a component of each of these higher level assemblies or subassemblies. By examining the structure in FIG. 3, it can be seen that assemblies B, C and K each have item Y as a component. The graph can have multiple start nodes and multiple end nodes or can consist of only a single node. The low-level code for a particular node is defined by the largest number of edges in a direct path from this node to an end (root) node. End nodes, therefore, have a low level code of zero. This figure shows the similarities between product structures (bills of material) and project networks.

Figure 5:
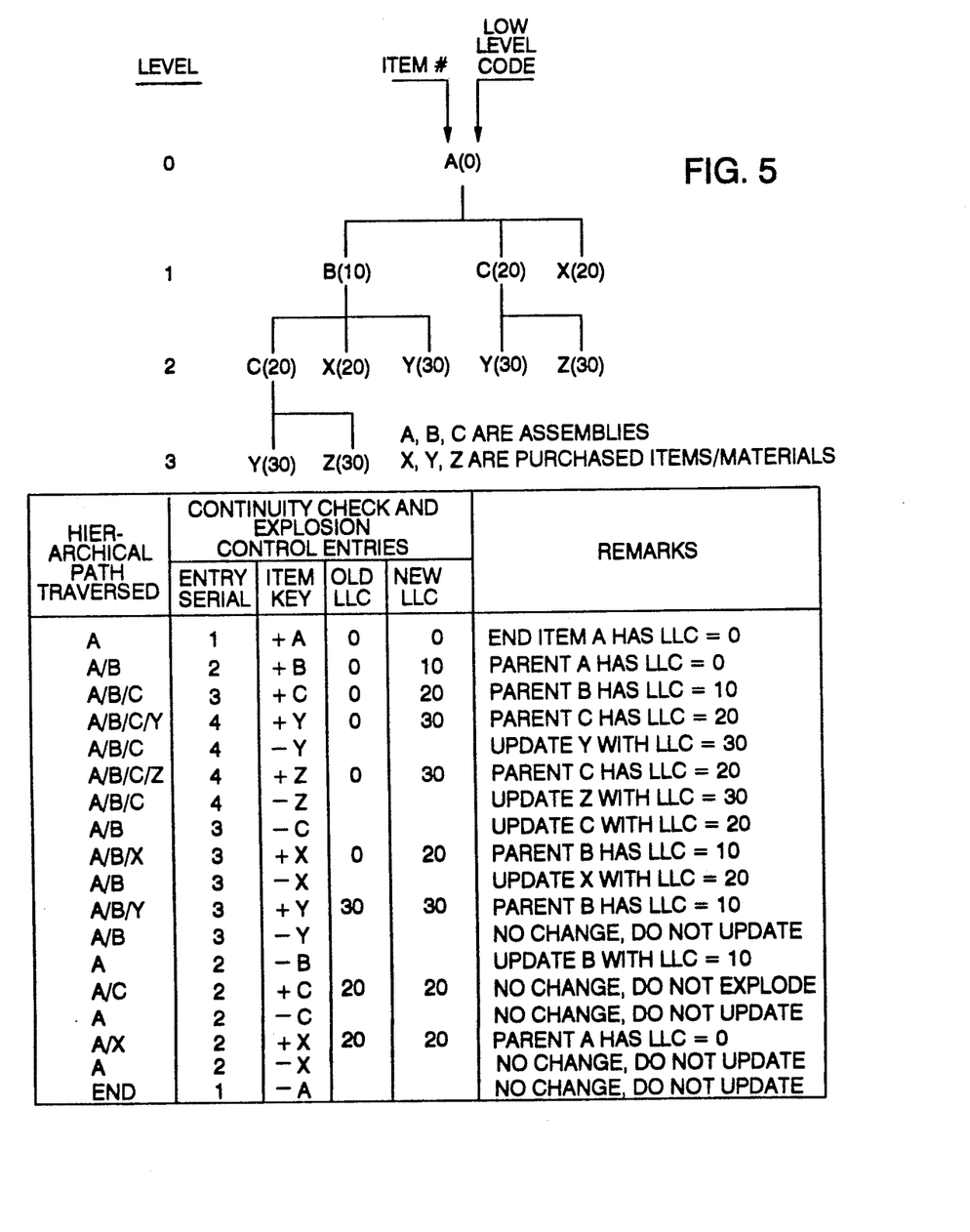
FIG. 5 is an illustration of the creation and update of low-level codes in a bill of material.

FIG. 5 is an illustration of the creation and update of low-level codes in a bill of material. The low-level code maintenance process is similar for both initial generation and subsequent updating. The initial generation of low-level codes for end item A with its product structure is shown in this figure. It is assumed that all master and product structure data have already been loaded into the database. The low level codes are recorded as part of the item master data with initial values of zero. The standard increment value for initial generation of low-level codes is made user selectable. The recommended increment value in this embodiment is ten, the purpose being to introduce gaps between low-level codes for successive levels at initial generation time. The gaps act as buffers to shorten the traversal paths during subsequent maintenance of low-level codes thus improving maintenance performance.

For bills of material, since a finite number of levels of product structure records are needed, for example 64, only up to 64 control records can be present in the system at any point in time. In the preferred embodiment shown in FIG. 2, a temporary list containing the continuity check and explosion control information is maintained in virtual storage by logic means 56. Each entry in this list has three elements: item key, old low-level code and new low-level code. If the list was stored in a database, each item would require an entry sequence number. Initially, the list containing the continuity check and explosion control information is empty. As the product structure tree contained in bill of material database 58 is traversed, entries from item master database 54 are added to and deleted from the list. FIG. 5 shows the addition and deletion of entries to the list during traversal of all hierarchical paths. A vertical explosion technique is used rather than a combination of vertical and horizontal explosion techniques. This serves to simplify the processing logic. In the forward path, all item data is read without any intention to update. In the backward path, only those items with changed low-level codes are retrieved once again in order to update their codes in the item master records. The control information required for explosion is merged with the continuity check control information. The current and new low-level codes are kept along with each item key. In the backward path, the current and new low-level codes for each item are compared and if they are unequal, the item record is updated with the new low-level code. This approach reduces processing overhead since there is no reason to keep any explosion control information in a control file as is required for the combination of horizontal and vertical explosions. The remarks column in FIG. 5 summarizes the sequence of updates made to the item master records in item master database 54.

The vertical explosion illustrated in FIG. 5 begins with assembly A. The first entry in the temporary list consists of item key A with an old low-level code of 0 and a new low-level code of 0. Additions to the temporary list are indicated in FIG. 5 by a plus sign in front of the item key; deletions are indicated by minus signs. The first hierarchical path traversed in the vertical explosion downward is A/B/C/Y. When item B is retrieved, its key, old low-level code of 0 and new low-level code of 10, are added to the temporary list. Similarly, items C and Y are added with new low-level codes of 20 and 30, respectively. Since item Y has no components, a backward traversal commences with both an update of the low-level code for item Y in item master database 54 to its new value of 30 and a deletion of the entry for item Y in the temporary list maintained by logic means 64.

Hierarchical path A/B/C/Z is traversed next in the bill of material explosion by adding item key Z with an old low-level code of 0 and a new low-level code of 30 to the temporary list. There are no components associated with item Z, so its new low-level code is updated in the item master database 54 to its new value of 30 followed by deletion of the corresponding entry in the temporary list. Since assembly C has no additional subcomponents, the backward traversal continues by updating item C's low-level code to a new value of 20 and deleting item C's entry in the temporary list.

Next, hierarchical path A/B/X is traversed by adding an entry for item X to the temporary list along with old and new low-level codes of 0 and 20 respectively. Item X has no components, so its low-level code is updated to 20 in the item master database 54, and its corresponding entry in the temporary list is deleted. Path A/B/Y is then traversed by adding item Y to the temporary list with an old low-level code of 30 and a new low-level code of 30. As discussed above, item Y does not have any components, so a backward traversal from item Y occurs. At this point in the processing, the old and new low-level codes for item Y are the same, thus, no update to item master database 54 is required. However, the entry for item Y is deleted from the temporary list.

There are no further components of assembly B to process. The backward traversal continues to assembly A by updating the low-level code of assembly B to 10 in the item master database 54, followed by deletion of the entry for assembly B in the temporary list. Item C is a component of assembly A, so the hierarchical path A/C is exploded by adding item C and its old and new low-level codes to the temporary list. In this instance, the old and new low-level codes are the same, which indicates that item C's low-level code has already been updated. A backward traversal occurs to assembly A by deleting item C's entry in the temporary list. Finally, the last component of assembly A is exploded. This final downward traversal occurs when item X is added to the temporary list with old and new low-level codes of 20. Since these codes are the same for item X, update to the item master database 54 has already occurred. The entry for item X is deleted from the temporary list and a backward traversal to assembly A occurs. With no further components to explode, assembly A is deleted from the temporary list and processing is completed.

The entire recovery process for continuity errors as implemented in commercially available software products is redundant and has been eliminated in this invention. There will be no damaged low-level codes in the database to recover from since low-level code updating is done during the backward pass (bottom-to-top) through a hierarchical path. Therefore, the presence of any continuity error is always detected before damaging updates are done to the database. This eliminates the need to maintain copies of original low-level codes for recovery purposes. When an error is detected, the insertion request for the product structure record is rejected. However, the product structure continuity is retained after rejecting the insertion request even if updating had been performed in some other hierarchical path which did not have continuity errors. At most, the low-level code of some item records may be a little higher than required. The effect is comparable to deletion of a product structure record. Low-level codes are usually not decremented when product structure records are deleted. Because it is not necessary to maintain a copy of the original low-level code for recovery purposes, a significant performance advantage is gained during normal updating and without any errors. The error recovery overhead previously associated with continuity checking is eliminated entirely.

This invention uses the simplified logic of vertical explosion and avoids the complex logic of diagonal explosion, which is a combination of horizontal and vertical explosion. This substantially reduces the volume of explosion control information to be maintained for both bill of material and project networks. It allows bill of material processing programs to maintain the control information in virtual storage. Furthermore, it allows merger of explosion control information with product structure continuity check information instead of storing them separately.

The low-level coding update logic described for bill of material processing can also be applied with some additional processing to network computations. This allows the sharing of application logic between bill of material and network processing programs. The low-level coding update processing is not an overhead for network processing programs. Rather, it is the main computation logic for network calculations.

Project networks can be stored in a computer database in a way that is very similar to storing a bill of material. It can be shown that any network can be converted to a hierarchy by introducing some redundant data where needed. For project networks, the low-level codes are used for both continuity checking and project network computation. The early start time is substituted for the low-level code for each activity relative to the project start time which has a value of zero. The duration of the activity is substituted for the increment value. Thus, the value of the increment is variable. The early finish time for an activity is determined by adding the duration of the activity to the early start time for the activity. This becomes the early start time for the succeeding activity. If there are no succeeding activities, or if the early start time of the preceding activity is nonzero, no further processing is required. If processing is required however, the activity is exploded into its succeeding activities. If the early start time of any succeeding activity is higher than or equal to the early finish time of the preceding activity, no updating is required. Otherwise, the early finish time of the preceding activity is stored as the new early start time of the succeeding activity. If the succeeding activity is followed by other activities, this process is repeated recursively. At the end of the forward pass, all computations for early start and early finish time are completed and the project completion time is determined. The process is then reversed using the project completion time as the late finish time for the project. In the backward pass, activity durations are subtracted from the late finish time to obtain the late start times. Late start times for succeeding activities indicate the late finish times for preceding activities. Thus, in a process similar to the forward pass, all late start and late finish times are computed in the backward pass. Simultaneously, total floats are computed by subtracting early start times from late start times. Any activity having a total float of zero is on the critical path.

Figure 6:
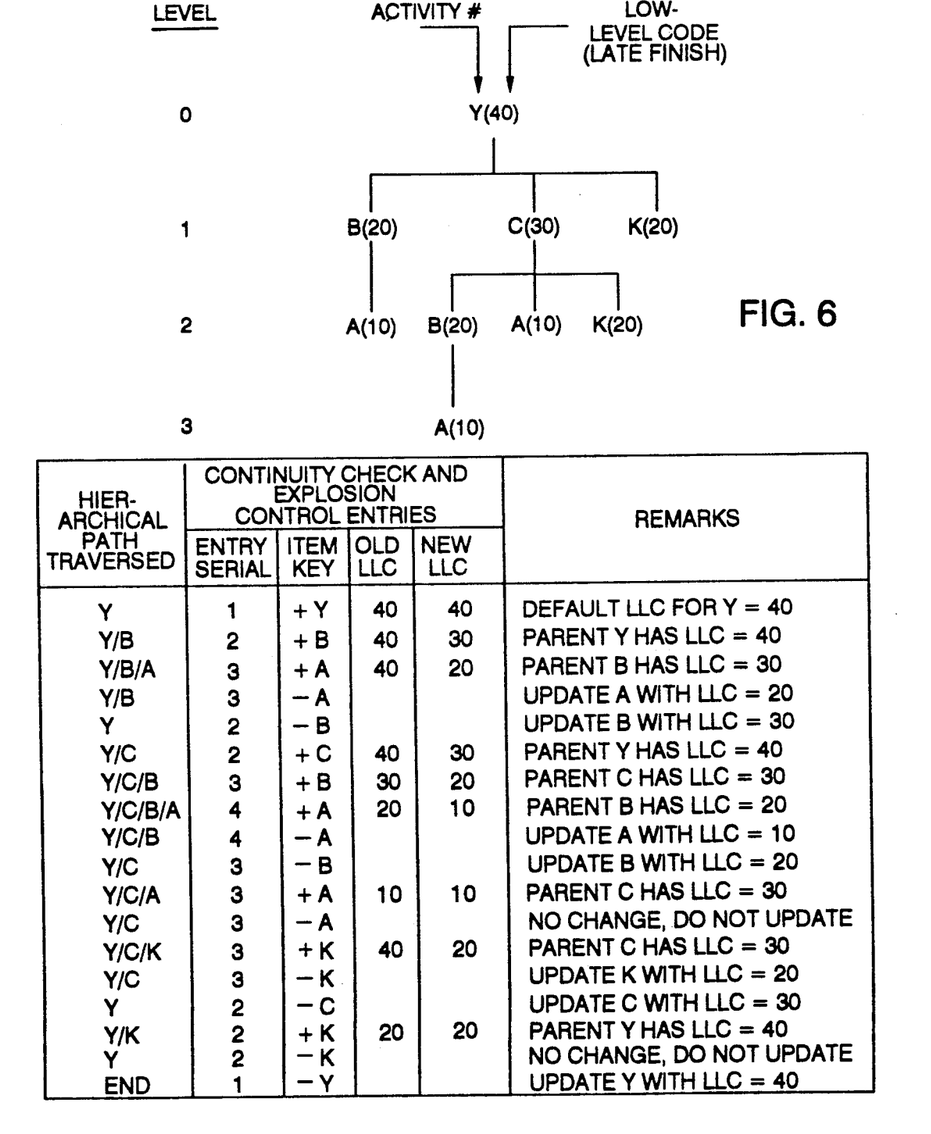
FIG. 6 is an illustration of the creation and update of low-level codes in a backward pass to compute late finish times in a project network.

FIG. 6 illustrates the creation and update of low-level codes in a backward pass to compute late finish times in a project network. The terminal activity Y in the network shown in FIG. 4 is used in this example. For simplicity, all activities in the network are assumed to have a duration of 10 time units. This is equivalent to the low-level code increment value of 10 as shown in FIG. 5 where Y has a low-level code value of 30. This means that the early start time for Y is 30. The early finish time equals the early start time plus the duration. So the early finish time for Y is 40. This happens to coincide with the late finish time for the entire project after computing the early finish times of all terminal activities, i.e., X, Y and Z. In computing the low-level codes in the backward pass, the default late finish time for all activities is assumed to be 40 unless subsequently modified to a lower value. The example in FIG. 6 shows how the low-level codes are progressively updated by decrementing the low-level codes by the amounts of the activity durations which are assumed to be 10 units of time for every activity in this example.

The sequence of events that occur during the backward pass through the network as illustrated in FIG. 6 will now be explained in more detail. The first entry made into the temporary list maintained by logic means 56 represents terminal activity Y and consists of item key Y with an old low-level code and and new low-level code of 40. In traversing the hierarchical path Y/B/A, the second entry in the temporary list is the item key for B, along with the old low-level code of 40 and new low-level code of 30. This new low-level code represents the late finish time for activity B and is equal to the late finish time of activity Y minus the duration time for activity Y. The third entry is activity A represented by item key A and having old and new low-level codes of 40 and 20 respectively. The new low-level code of 20 for activity A represents the late finish time for activity A and is equal to the late finish time for activity B minus the duration time for activity B. Since there are no additional tasks preceding activity A, a backward traversal commences by updating the low-level code for activity A to 20 in item master database 54. The entry for activity A is deleted from the temporary list. Continuing to retrace the path back up this branch of the tree structure, the logic means 56 next updates the item master record in database 54 and deletes the entry for activity B in the temporary list. The low-level code for activity B is updated to 30.

The next hierarchical path traversed is Y/C/B/A. The progression is for item C to be added to the temporary list with a new low-level code of 30 followed by the addition of item B to the list with old and new low-level codes of 30 and 20 respectively. The new low-level code for item C corresponds to the late finish time of activity Y minus the duration time of activity Y. Similarly, the new low-level code of activity B is the late finish time for activity C (low-level code of 30) minus the duration time of activity C (10 units of time). Activity A becomes the fourth entry on the list. Its old low-level was 20 and its new low-level code is the new late finish time for activity B (20) minus the duration time of activity B (10). Since activity A has no predecessor activity, the path up the branch is retraced. The low-level code for activity A is updated to 10 in item master database 54 and the entry for this activity is deleted from the temporary list. In the same manner, the low-level code for activity B is updated to 20 and activity B is deleted from the temporary list.

The hierarchical path Y/C/A is next traversed by adding activity A to the temporary list with old and new low-level codes of 10. Since the low-level code for successor activity C is 30 and the duration for activity C is 10, the new low-level code for activity A is the same as the old low-level code. The path back up the branch is traversed by deleting the entry for activity A from the temporary list. Its low-level code does not need to be updated.

The path Y/C/K is next traversed by adding item K to the temporary list with its original low-level code of 40 and its new low-level code of 20. The new low-level code is obtained by subtracting the activity duration time of activity C from its low-level code (representing the activity's late finish time) of 30. The path is then retraced by updating the low-level code for K in item master database 54 to a value of 20. The entry for item K is then deleted from the temporary list. Next, the low-level code for item C is updated to a value of 30 in item master database 54.

The final path traversed is Y/K. An entry for item K is added to the temporary list with old and new low-level codes of 20. Having no predecessor activity, activity K is then deleted from the temporary list and no changes are needed to item master database 54. Finally, activity Y is deleted from the temporary list with its low-level code in item master database 54 previously set to 40.

For project networks, since the number of levels is not necessarily limited to some small quantity, continuity check control information is stored in a database as in prior art methods for bill of material processing. The database manager can detect any attempt to add a row with a duplicate key since a unique index is created for the key. To facilitate backward traversal through the hierarchical paths, a sequence number is maintained for each entry in the control data base. The effects of deletion of network relationships cannot be ignored as in the case of bill of material processing. Early start times for affected activities need to be recomputed. Deletions can have a significant impact on performance. For minor or single deletions, where-used information for the succeeding activities are analyzed to reestablish the early start time for those activities. If there is a change, the affected activity is re-exploded and further analysis is performed. For major or multiple deletions, the early start times for all activities are initialized to zero and the initial generation procedures are repeated from scratch.

While the invention has been particularly shown and described with reference to the particular embodiment thereof, it will be understood by those skilled in the art that various changes in form and details may be made therein without departing from the spirit and scope of the invention.

Having thus described my invention, what I claim and desire to secure by Letters Patent is as follows:

1. A method for processing bill of material data stored in an information processing system wherein product structure data is represented through low-level coding in which the low-level code of each component is numerically higher than the low-level code of its parent assembly, said method comprising the steps of:
   traversing a product structure hierarchy representing a bill of material, said product structure hierarchy containing a plurality of hierarchical paths wherein each hierarchical path is traversed in a sequence beginning with a leftmost hierarchical path and continuing through a rightmost hierarchical path, said traversing of each hierarchical path proceeding first in a downward vertical traversal from a highest level item to a lowest level item, and then in an upward vertical traversal until a higher level item is found that is also on a next hierarchical path to traverse;
   assigning a new low-level code to each item encountered in each of said plurality of hierarchical paths traversed if the low-level code of said each item is lower than the low level code of its immediate predecessor item;
   maintaining a temporary list of an item identifier, a corresponding current low-level code, and a newly assigned low-level code for each item encountered in the hierarchical path currently traversed; and
   updating the low-level code for said each item if the newly assigned low-level code of said each item is higher than the corresponding current low-level code for said each item during the upward vertical traversal of the hierarchical path currently traversed.

2. The method of claim 1 including the step of performing continuity checking during the downward vertical traversal of each hierarchical path by determining if there are any duplicate item identifiers in said temporary list.

3. The method of claim 1 further including establishing an initial incremental value for assigning said low-level codes that permits an insertion of additional items into the product structure hierarchy without requiring an update of the current low-level codes.

4. The method of claim 2 wherein the step of performing continuity checking is performed before the step of updating the low-level code.

5. A system for processing bill of material data stored in an information processing system wherein product structure data and item master data are stored separately in a product structure relational database and an item master relational database, said system comprising:
   list means in memory for temporarily storing an item identifier, a current low-level code, and a newly assigned low-level code for each item encountered during a traversal of a product structure hierarchy representing a bill of material, said product structure hierarchy containing a plurality of hierarchical paths; and
   logic means for performing continuity checking and for performing low-level code updating during said traversal of said product structure hierarchy, wherein said continuity checking is performed in a downward vertical traversal of each hierarchical path and said low-level code updating is performed in an upward vertical traversal of each hierarchical path.

6. The system of claim 5 wherein said continuity checking is performed by said logic means by comparing the item identifier of each item added to said list means with the item identifiers of all other items that had been stored previously in said list means.

7. The system of claim 5 wherein said low-level code updating is performed by said logic means by comparing the current low-level code and the newly assigned low-level code for each item in said list means and updating the low-level code in the product structure relational database for each item if the newly assigned low-level code is higher than the current low-level code.

8. A method for processing project network data stored in an information processing system wherein project activity start data is represented through low-level coding in which a forward pass low-level code for each activity is equated to an early start time for that activity and a backward pass low level code for each activity is equated to a late finish time for that activity and a total float for each activity is the difference between the backward pass low level code and a sum of the forward pass low-level code and an activity duration time, said method comprising the steps of:
   arranging a project network as a hierarchy of activities to be completed wherein said project network hierarchy contains a plurality of hierarchical paths, and traversing each hierarchical path in sequence beginning with a leftmost hierarchical path and continuing through a rightmost hierarchical path, said traversing of each hierarchical path proceeding first in a downward vertical traversal representing a forward pass from a first activity to a last activity, and then in an upward vertical traversal representing a backward pass until a higher level activity is found that is also on a next hierarchical path to traverse;

assigning the forward pass low-level code to each activity encountered in each of said plurality of hierarchical paths traversed during the forward pass that is higher than that of an immediately preceding activity by an amount equal to a duration of the immediately preceding activity;

assigning the backward pass low-level code to each activity encountered in each of said plurality of hierarchical paths traversed during the backward pass that is lower than that of an immediately succeeding activity by an amount equal to the duration of said activity encountered;

comparing the sum of the forward pass low-level code and the activity duration time with the backward pass low-level code for each activity to determine the total float for each activity; and establishing a critical path through the project network by marking each activity having the total float of zero.

9. The method of claim 8 including assigning the forward pass low-level code of zero to an activity at a highest level in the network, which is characterized in not having any preceding activity, but having at least one succeeding activity.

10. The method of claim 8 including assigning the backward pass low-level code to a final activity to be completed that is equal to the sum of the forward pass low-level code for that activity and the duration time for that activity.

11. The method of claim 8 further including the step of regenerating the forward pass low-level code and the backward pass low-level code for each activity that is affected by a deletion of an unnecessary activity from said project network.

12. The method of claim 8 further including the step of performing continuity checking during an insertion of an additional activity into one hierarchical path of said project network and, if said additional activity is already present on said one hierarchical path, restoring the forward pass low-level code of each activity whose forward pass low-level code had been modified by the insertion.

13. The method of claim 12 wherein said continuity checking is performed on the forward pass through each hierarchical path in said project network.

* * * * *